J. B. & L. C. CLARK.
Machine for Heading Bolts.
No. 230,920.  Patented Aug. 10, 1880.
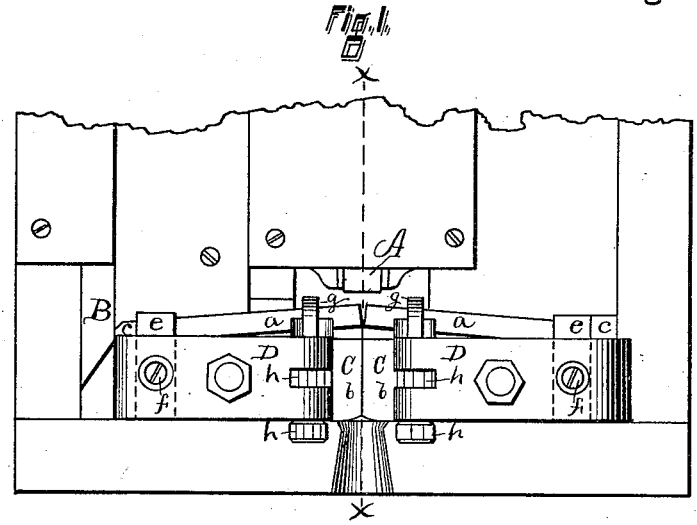
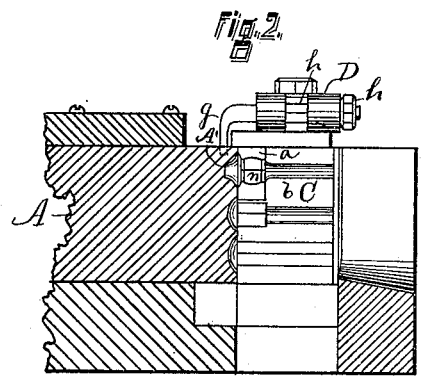
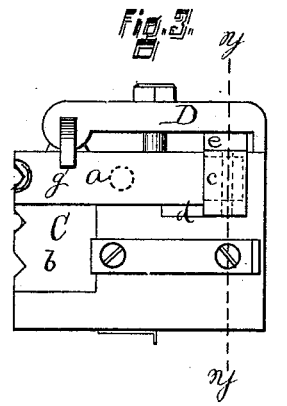
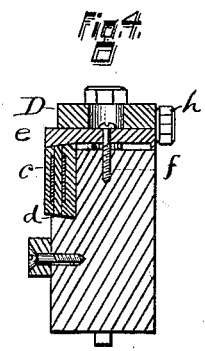
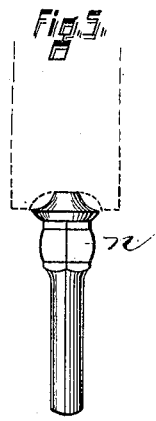
Witnesses,
John Edwards Jr
J. J. Markley
Inventors,
James B. Clark
Lucas C. Clark
By James Shepard
att.

UNITED STATES PATENT OFFICE.

JAMES B. CLARK AND LUCAS C. CLARK, OF PLANTSVILLE, CONNECTICUT.

MACHINE FOR HEADING BOLTS.

SPECIFICATION forming part of Letters Patent No. 230,920, dated August 10, 1880.

Application filed November 24, 1879.

*To all whom it may concern:*

Be it known that we, JAMES B. CLARK and LUCAS C. CLARK, both of Plantsville, in the county of Hartford and State of Connecticut, have invented certain new and useful Improvements in Machines for Heading Bolts, of which the following is a specification.

Our invention relates chiefly to certain improvements upon the patent to J. B. Clark, No. 165,542, dated July 13, 1875.

In the accompanying drawings, Figure 1 is a plan view of dies and part of a machine for heading carriage-bolts, which embody our invention. Fig. 2 is a vertical section of the same on line $x\ x$ of Fig. 1. Fig. 3 is a rear view of a detached part, showing one of the squaring and holding dies and its carriage. Fig. 4 is a vertical section of the same on line $y\ y$ of Fig. 3; and Fig. 5 is a side elevation of the preliminary blank as produced by the first operation with our dies.

The driving-shaft and its cams for forcing up the header A and side wedge, B, for closing the dies may be the same as those in ordinary use, and therefore it is deemed unnecessary to show or describe them. We have shown three recesses in the header A and three pairs of grooves in the squaring and holding die block C C, as we prefer to use them successively in one machine, instead of in separate machines; but the upper recess shaping and holding groove are those which more particularly relate to our invention, and which might be used in a machine by itself and the bolt finished by ordinary dies in an ordinary holder.

$a\ a$ designate the movable portion of the squaring or shaping die block C C, and $b$ the holding or stationary portion thereof, the same moving, when once adjusted with respect to each other, substantially as described in said former patent; but instead of hinging or securing them directly to the die-blocks without any lateral adjustment thereon, we hinge them in laterally-adjustable blocks $c\ c$, preferably dovetailed into grooves or ways $d$, Figs. 3 and 4, and clamped by means of clamp $e$, which is held in place by the screw $f$. By loosening said screw the blocks $c\ c$ may be adjusted so that the movable shaping-dies $a\ a$ may be closed more or less, as may be desired, at each operation of the machine, or after redressing them when worn. We prefer to have these adjustable blocks so fitted that they may abut against a solid portion of the die-blocks when clear back, as shown in Fig. 3, and when adjusted by moving them nearer together, that their wedges may be placed behind them for them to abut, and thereby not depend wholly upon the clamping device for holding them in place.

The die-blocks C C are clamped in place by means of the straps D D, and through one end of said straps there is an adjustable hook, $g$, which hangs over the inside of the movable shaping-dies $a\ a$, to limit their movement away from the holding part of the dies, and their position may be regulated by nuts $h\ h$ on the threaded body of said hooks. A spring resting under each shaping-die, the position of which spring is indicated by the broken circle in Fig. 3, has a tendency to keep said dies in the position shown in Fig. 1.

The second part of our invention may be employed in solid dies; but it is more particularly useful, especially the shape of the neck-forming portion, when the shaping and holding portions of the dies are made separate, as hereinbefore described, so as to simultaneously upset the stock at both ends of the square neck, than it is in a solid die.

Instead of having the head wholly in the header A, we countersink the side of the dies $a\ a$, and make the head-forming recess A' in the holder smaller, so that the head is formed in both the header and dies into the form shown in Fig. 5, instead of being formed wholly in the header. We also form a transverse swell, $n$, in the middle of the length of the recess which constitutes the neck-forming portion of the die, so as to produce the form of neck shown in Fig. 5.

The object of making the preliminary head of the form shown is that in the subsequent operation the head-forming recess shall embrace the preliminary head a little below its greatest diameter, as indicated by broken lines in Fig. 5, and thereby avoid the usual tendency of the metal to throw out over the end of the header and form a fin, and at the same time to get the preliminary head large enough to fill the subsequent head-forming recess. The swell in the neck portion of the dies allows stock to accumulate at the point which is least likely to fill in work upset at both ends of the neck, so that when the square neck is finished neat and full square corners are secured for the whole length of the neck.

We claim as our invention—

1. In a bolt-header having the stationary holding and movable shaping-dies, the combination of the shaping-dies *a a*, laterally-adjustable blocks *c c*, to which said dies are hinged, and mechanism for fastening the blocks *c c* in position, substantially as described, and for the purpose specified.

2. The combination, with the shaping-dies *a a*, of the straps D D and the adjustable hooks *g g*, substantially as described, and for the purpose specified.

3. The die A, having the preliminary head-forming recess A', in combination with the neck-shaping die having countersunk face, both being relatively shaped so as to produce the form of preliminary head shown in Fig. 5, substantially as described, and for the purpose specified.

4. The neck-forming dies having the middle portion of their recess enlarged for producing the transverse enlargement on the neck of the blank, substantially as described, and for the purpose specified.

JAMES B. CLARK. [L. S.]
LUCAS C. CLARK. [L. S.]

Witnesses:
JOS. N. COWLES,
LEWIS D. WHITING.